United States Patent [19]
Knapp et al.

[11] Patent Number: 5,761,364
[45] Date of Patent: Jun. 2, 1998

[54] OPTICAL WAVEGUIDE

[75] Inventors: James H. Knapp, Chandler; Laura J. Norton, Apache Junction; Joseph E. Sauvageau, Chandler, all of Ariz.

[73] Assignee: Motorola, Inc., Schaumburg, Ill.

[21] Appl. No.: 552,158

[22] Filed: Nov. 2, 1995

[51] Int. Cl.$^6$ ........................................... G02B 6/10
[52] U.S. Cl. ........................ 385/123; 385/43; 385/132
[58] Field of Search ................... 385/43, 123, 129–132, 385/146

[56] References Cited

U.S. PATENT DOCUMENTS

| | | | |
|---|---|---|---|
| 3,756,688 | 9/1973 | Hudson et al. | 455/612 |
| 3,832,028 | 8/1974 | Kapron | 385/43 |
| 4,072,399 | 2/1978 | Love | 350/96.16 |
| 5,271,083 | 12/1993 | Lebby et al. | 385/130 |
| 5,345,527 | 9/1994 | Lebby et al. | 385/114 |
| 5,359,618 | 10/1994 | Lebby et al. | 372/45 |
| 5,367,593 | 11/1994 | Lebby et al. | 385/132 |
| 5,389,312 | 2/1995 | Lebby et al. | 385/129 |
| 5,480,764 | 1/1996 | Gal et al. | 430/321 |

OTHER PUBLICATIONS

L.C. Bobb and P.M. Shankar, Microwave Journal, "Tapered Optical Fiber Components and Sensors", May 1992, pp. 218–228.

A. Fenner Milton and William K. Burns, IEEE Journal of Quantum Electronics, vol. QE–13, No. 10, "Mode Coupling in Optical Waveguide Horns", Oct. 1977, pp. 828–835.

Lee et al., Journal of Optical Communications, "Analysis of Radiation from Tapered Multimode Slab Waveguides by the Ray–Optics Approach", 1993, pp. 101–105.

Yutaka Uematsu et al., IEEE Journal of Quantum Electronics, vol. QE–15, No. 2, "Effcient Power Coupling Between an MH LED and a Taper–Ended Multimode Fiber", Feb. 1979, pp. 86–92.

Takeshi Ozeki and B.S. Kawasaki Electronic Letters, "Mode Behaviour In A Tapered Multimode Fibre", vol. 12, No. 16, Aug. 5, 1976, pp. 407–408.

Takeshi Ozeki and B.S. Kawasaki, Electronic Letters, "Efficient Power Coupling Using Taper–Ended Multimode Optical Fibres", vol. 12, No. 23, Nov. 11, 1976, pp. 607–608.

Takeshi Ozeki et al., Applied Physics Letters, "Tapered Section of Mutimode Cladded Fibers as Mode Filters and Mode Analyzers", vol. 26, No. 7, Apr. 1, 1975, pp. 386–388.

*Primary Examiner*—John Ngo
*Attorney, Agent, or Firm*—George C. Chen

[57] ABSTRACT

An optical system (22) contains an optical waveguide (10) having cladding layers (11, 12) defining a channel (19) that is filled with an optically conductive core material (20). The index of refraction of the optically conductive core material (20) is greater than the index of refraction of the cladding layers (11, 12) to maintain total internal reflection of an input light beam (39). The channel (19) is tapered at an angle (32) to increase beam divergence of the input light beam (39). The beam divergence is increased while the input light beam (39) is reflected through the optically conductive core material (20) from an opening (26) to an exit (27) of the channel (19). The taper of the channel (19) maintains an adiabatic characteristic for the waveguide (10).

23 Claims, 1 Drawing Sheet

OPTICAL WAVEGUIDE

The U.S. Government has rights in this invention, pursuant to Industrial Fellows Agreement No. CN-1152 between the National Institute of Standards and Technology (NIST) and Motorola, Inc.

BACKGROUND OF THE INVENTION

This invention relates, in general, to waveguides, and more particularly, to optical waveguides that change beam divergence.

Vertical cavity surface emitting lasers (VCSELs) are capable of converting electrical signals to optical signals or laser beams. The Food and Drug Administration (FDA) has established public safety guidelines for lasers and laser beams. In particular, for Class I laser safety standards, the power and beam divergence of a laser beam must meet certain criteria. However, operated at high power levels, the optical signal or laser beam emitted from VCSELs often do not meet the Class I laser safety standards.

Therefore, the optical signal should be altered to comply with the power and beam divergence criteria of the FDA Class I laser safety standards. In doing so, the data carried by the optical signal should not be corrupted, and the power of the optical signal should not be diminished such that the quality of the optical signal is detrimentally affected. However, many existing solutions for changing a VCSEL optical signal to meet FDA Class I safety standards fail to maintain adequate power and data integrity for the optical signal. Moreover, the existing solutions are typically expensive and difficult to fabricate.

Accordingly, a need exists for a low cost and manufacturable optical waveguide that increases beam divergence to meet FDA Class I safety standards while maintaining laser power. The optical waveguide should be compatible with existing optical systems and should maintain the integrity of the data transmitted by the optical signal.

DETAILED DESCRIPTION OF THE DRAWINGS

Figure 1:
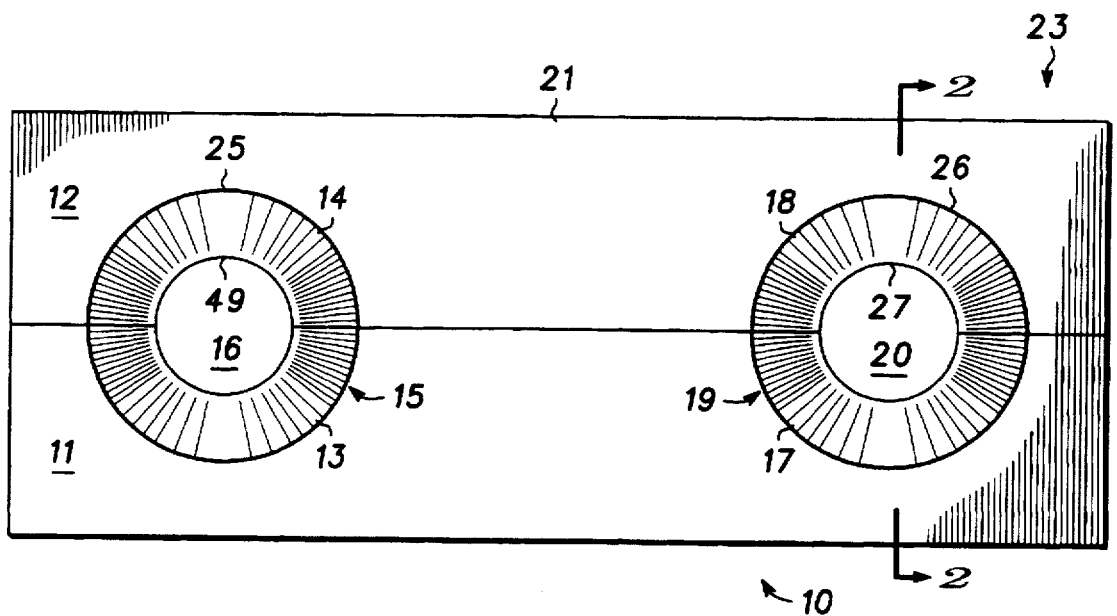
FIG. 1 illustrates an enlarged end view of an optical waveguide in accordance with the present invention.

Turning to the drawings for a more detailed description, FIG. 1 illustrates an enlarged end view of an optical waveguide 10 in accordance with the present invention. Specifically, optical waveguide 10 includes portions 11 and 12 of a molded cladding layer 21 that surround optical channels 15 and 19. Optical waveguide 10 is a part of an optical system 22 (shown in FIG. 2), which also includes a light source 28 and a light conductor (not shown).

Portion 11, hereinafter referred to as cladding layer 11, contains surfaces 13 and 17 while portion 12, hereinafter referred to as cladding layer 12, contains surfaces 14 and 18. Surfaces 13 and 14 define or delineate channel 15 while surfaces 17 and 18 delineate channel 19. Waveguide 10 is depicted in FIG. 1 from an end 23 that contains an opening 25 for channel 15 and an opening 26 for channel 19. Channels 15 and 19 have exits 49 and 27, respectively, at an end opposite end 23. In a preferred embodiment, surfaces 13, 14, 17 and 18 are round or curved; channels 15 and 19 are tubular or cylindrical; openings 25 and 26 and exits 27 and 49 are circular in shape; and openings 25 and 26 are larger than exits 27 and 49. In the preferred embodiment, opening 26 and exit 27 are hereinafter referred to as round opening 26 and round exit 27, respectively.

It is understood that cladding layers 11 and 12 are depicted as symmetrical halves of waveguide 10 for simplicity and clarity of the subject invention. For instance, although not shown in FIG. 1, inter-locking and alignment mechanisms for waveguide 10 can be included in cladding layers 11 and 12. Furthermore, while FIG. 1 depicts two channels 15 and 19 within waveguide 10, it is understood that a waveguide of the subject invention has at least one channel but can also have a plurality of channels. Additionally, a larger portion of channel 15 can be delineated or defined by surface 14 of cladding layer 12 compared to that of surface 13 of cladding layer 11.

Preferably, cladding layers 11 and 12 are molded using mold plates manufactured from metal workpieces by an electrical discharge machining (EDM) process. The metal workpieces and mold plates can be composed of conventional molding plate materials including, but not limited to, a crucible powdered metal or a high alloy steel comprising vanadium, chromium, nickel, and iron. As known in the art, an EDM process uses electric sparks, electric arcs, or other electronic discharges generated between a traveling wire electrode and the metal workpiece to erode and remove metal from the workpiece to shape a mold plate. In effect, an EDM process is like an electronic band saw where the saw blade is a thin, consumable, moving-wire electrode that never actually touches the workpiece. Instead of using a cutting or grinding process as in conventional machine shop practice, a vaporizing, melting, or eroding process is used to shape the mold plate.

Conducting or pulsing a current through the traveling wire electrode creates a pulsed potential between the wire electrode and the metal workpiece. The pulsed potential generates electric sparks or arcs, and the heat from the electric sparks melt or erode a small volume of the metal workpiece. A dielectric or non-conducting liquid, preferably deionized water, is used to flush the eroded region to remove the eroded material and to cool the metal workpiece. After the cutting region is flushed, another electric spark is generated to melt or erode another small portion of the metal workpiece. This EDM process of sparking, eroding, and flushing is preferably repeated thousands of times per second to shape or form the mold plate. To form a mold plate having a tapered or sloped feature, either the metal work piece or the wire electrode is positioned at an appropriate angle.

During the EDM erosion operation, a force is exerted on the wire electrode, which causes the wire electrode to bow or bend away from the direction of the erosion path. Consequently, the wire electrode is typically kept under a predetermined mechanical tension to keep the wire electrode moving in a relatively straight line and to more accurately shape the metal workpiece. When changing the erosion direction of the EDM process at an angular feature or a corner of the mold plate, the tension of the wire electrode is conventionally increased to ensure a precise corner tolerance. Other process parameters that are changed during a conventional "cornering routine" include reducing the pressure of the deionized water used for flushing and also reducing the travel speed at which the cut or burn is made into the metal workpiece.

However, problems arise when attempting to use this conventional "cornering routine" to fabricate small features out of a thick metal workpiece. In particular, when the wire electrode is thin, it will snap or break during the "cornering routine" due to the increased tension and the other process parameter changes of the "cornering routine." The diameter of the wire electrode should be smaller than the minimum feature size of the mold plate to ensure precise formation of the smallest features and their respective corners of the mold plate. For example, if a corner of a feature of the mold plate has a diameter of approximately 25 microns, the diameter of the wire electrode should be at least approximately equal to if not less than 25 microns in order to ensure that the precise dimensions of the corner are met. However, having such a small diameter, the wire electrode is not very strong, and consequently, the wire electrode will break or snap when the increased tension is placed upon it during the "cornering routine."

To circumvent this wire breakage problem, the preferred EDM method of manufacturing the mold plates, which mold cladding layers 11 and 12 of the present invention, maintains a constant mechanical tension for the wire electrode during the entire erosion process for shaping the workpiece, including during the formation of corner features. Additionally, the magnitude of the current, the pressure of the flushing fluid, and the travel speed of the cutting path are also kept constant and are not altered during the cornering routine of the present invention.

After shaping the mold plates from metal workpieces, the EDM process can be repeated several times over the surface of the mold plate to further refine the shapes of the mold plate features and to create a final finish on the mold plate such that additional honing, grinding, or polishing is not required. However, in the preferred embodiment, an additional polish is still used. The final finish on the mold plates can produce a controlled surface finish or roughness on molded cladding layers 11 and 12 that is used for modal mixing though waveguide 10, which will be discussed in more detail below.

The manufactured mold plates described above are used to mold cladding layers 11 and 12. A material available under the trademark HYSOL MG18 from Dexter Corporation is preferably used for the molding compound to form cladding layers 11 and 12. By way of example only, a molding temperature of approximately 110 to 175 degrees Celsius (°C.) and a molding pressure of approximately 30 to 75 bars are preferably used. Typically, approximate transfer times for the molding compound range from about 30 to 50 seconds at a temperature of approximately 150° C. to about 15 to 30 seconds at approximately 175° C. Also, approximate curing times for cross-linking the molding compound range from about 3 to 5 minutes at approximately 150° C. to about 2 to 4 minutes at approximately 175° C. The molding compound shrinks while curing due to the drying out or evaporation of solvents within the molding compound. Therefore, during curing, adequate pressure is maintained to ensure proper compaction of the molding compound. It is noted that the appropriate transfer and curing times, temperatures, and pressures can extend outside of those ranges listed above depending upon, for example, the size of the cladding layer being molded, the number of pieces being simultaneously molded, the distance the molding compound is transported, and the desired level of molding compound compaction. Furthermore, pre-heating and post-curing steps can be utilized during the fabrication of cladding layers 11 and 12.

Next, cladding layers 11 and 12 are aligned to form channels 15 and 19. Channels 15 and 19 contain an optically conductive core material 16 and 20, respectively, which conducts or transmits light. Optically conductive core material 16 can be different from, but is preferably similar to, optically conductive core material 20. Optically conductive core material 16 and 20 is deposited within or flowed into channels 15 and 19, respectively, and preferably completely fills channel 15 and 19, respectively. However, while not shown in FIG. 1, optically conductive core material 16 can alternatively be used to coat surfaces 13 and 14 while leaving a central core through which light is transmitted. The central core can contain other materials to create a graded channel or can contain air, other appropriate gases, or even a miniature optical fiber.

Optically conductive core material 16 and 20 comprises a plastic, polymide, or epoxy that is preferably applied in a liquid state and cured into a solid state using an air drying technique, UV light exposure, or a heat treating process. The specific curing method used depends upon the specific material used for optically conductive core material 16 and 20. Preferably, optically conductive core material 16 and 20 is used as an adhesive or epoxy for coupling or bonding cladding layers 11 and 12 and comprises a material available under the trademark EPO-TEK 353ND from Epoxy Technology, Inc. By way of example only, a curing temperature of approximately 75° to 100° C. can be applied for approximately 50 to 75 minutes at ambient to cure optically conductive core material or light conducting adhesive 16 and 20. Higher temperatures can be used to cure optically conductive core material 16 and 20, but the curing temperature should be below the glass transition temperature of cladding layers 11 and 12 to prevent deformation of cladding layers 11 and 12 during the curing of optically conductive core material 16 and 20.

Figure 2:
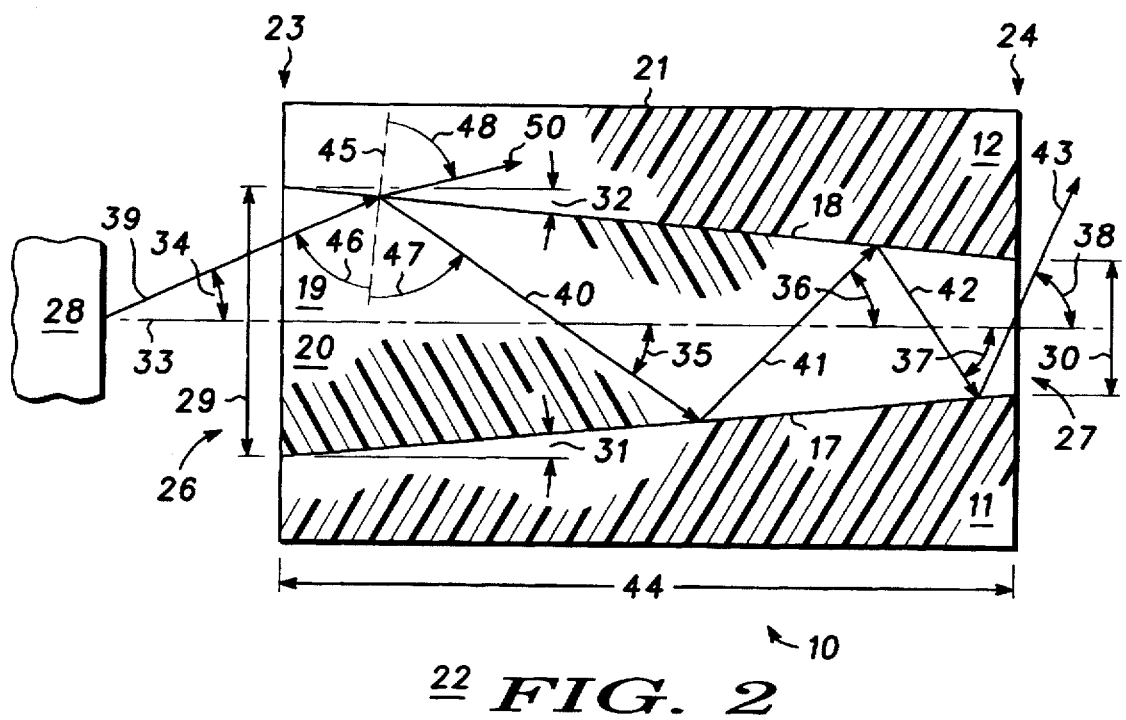
FIG. 2 portrays an enlarged cross-sectional view of the optical waveguide of FIG. 1 taken along reference line 2—2.

Referring now to FIG. 2, an enlarged cross sectional view of optical waveguide 10 is portrayed as a portion of optical system 22 of FIG. 1 taken along reference line 2—2. In particular, FIG. 2 depicts a cross section of channel 19 delineated by surfaces 17 and 18 of cladding layers 11 and 12, respectively. Round opening 26 is at end 23 and has a diameter or width 29 while round exit 27, which has a width 30 smaller than width 29, is at an end 24 that is opposite end 23. Channel 19 has a length 44 measured along a central axis 33. In the preferred embodiment, width 29 is approximately 60–200 microns; width 30 is approximately 30–60 microns; and length 44 is approximately 1–40 millimeters. While the following description focuses specifically on channel 19, it is understood that the discussion below also applies to channel 15 of waveguide 10.

Light source 28 emits an input light beam 39 into round opening 26 of waveguide 10, and an optical fiber (not shown) or other light conductor is coupled to round exit 27 to carry an output light beam 43 away from end 24 of waveguide 10. Input light beam 39 is emitted at an input half-angle 34 measured from central axis 33. Light source 28 is preferably a vertical cavity surface emitting laser (VCSEL) but can be any other appropriate light source. Input light beam 39 is reflected through channel 19 and out of round exit 27 at an output half-angle 38 measured from central axis 33 and is identified as output light beam 43.

The Food and Drug Administration (FDA) has established Class I laser safety standards that specify a maximum laser beam power density that is safe for public usage. The power density is a function of the beam divergence, which is represented as output half-angle 38 in FIG. 2, and the power of output light beam 43. In the preferred embodiment, the power of output light beam 43 is approximately 300–800 microwatts, which requires output half-angle 38 of output light beam 43 to be at least approximately 12 degrees (°) in order to comply with the FDA Class I laser safety standards. However, input light beam 39 from light source 28 typically has an input half-angle 34 of about 1°–12°. Therefore, an increase in beam divergence of greater than approximately 5° is required from opening 26 to exit 27. It is understood that a higher powered light beam would require a larger output half-angle, and a lower powered light beam could use a smaller output half-angle in order to comply with the FDA Class I laser safety standards.

It is further understood that the power of the light beam could be reduced to meet the FDA safety standards. However, reducing the power of the light beam could degrade the integrity of the data transmitted by the light beam and increase the bit-error rate, which will be described in more detail below. Therefore, to comply with the FDA Class I laser safety standards, it is preferred to increase the beam divergence to reduce the power density rather than to reduce the power of the light beam.

Waveguide 10 produces the required amount of beam divergence by tapering channel 19 such that width 29 of round opening 26 is greater than width 30 of round exit 27 as depicted in FIGS. 1 and 2. As portrayed in FIG. 2, channel 19 is tapered such that surfaces 17 and 18 are sloped at taper angles 31 and 32, respectively, measured from lines parallel to central axis 33. Therefore, in the preferred embodiment where round opening 26 and round exit 27 are circular, channel 19 is conical in shape with angles 31 and 32 being between approximately 0.01° and 1.0°. However, depending upon the desired application, angles 31 and 32 can be outside the preferred range of 0.01° to 1.0°. Moreover, while angles 31 and 32 can differ from each other, they are identical in the preferred embodiment of conical channel 19. While the degree of taper can vary along length 44 of channel 19, the taper between opening 26 and exit 27 is preferably monotonic and is preferably constant along length 44 as portrayed in FIG. 2.

As input light beam 39 bounces or reflects off of surface 18 of channel 19, input half-angle 34 of input light beam 39 increases by twice the amount of the angle of surface 18, which equals or is determined by angle 32. In other words, input light beam 39 reflects off of surface 18 and is now labeled as light beam or light 40 with a half-angle 35, which equals the sum of input half-angle 34 plus twice the value of angle 32. Subsequently, light beam 40 reflects off of surface 17 and is now labeled as light beam 41 with half-angle 36, which is the sum of half-angle 35 plus twice the value of angle 31. Next, light beam 41 reflects off of surface 18 to create light beam 42 with half-angle 37 that reflects off of surface 17 to create output light beam 43. With each successive reflection, the half-angle of the light beam is increased. To increase the amount of beam divergence or the magnitude of output half-angle 38, a longer length 44 of channel 19 or larger slope angles 31 and 32 can be employed.

In order to maintain a high light transfer efficiency from round exit 27 of waveguide 10 to an optical fiber (not shown), the numerical aperture of an optical fiber, $N_{A(fiber)}$, should be similar to the numerical aperture of waveguide 10, $N_{A(waveguide)}$. The refractive index of optically conductive core material 16 and 20 ($N_1$), the refractive index of cladding layers 11 and 12 ($N_2$), the numerical aperture of waveguide 10, and the numerical aperture of the optical fiber are related by equation 1:

$$N_{A(waveguide)} = N_{A(fiber)} = \sin(\theta_o) = \sqrt{N_1^2 - N_2^2} \qquad \text{(eq. 1)}$$

where $\theta_o$ is defined as a maximum output half-angle 38, which is the half-angle of light transmitted out of waveguide 10 and into an optical fiber. The indices of refraction for cladding layers 11 and 12 and optically conductive core material 20 are chosen to match the numerical aperture of the optical fiber, which determines a light acceptance half-angle of the optical fiber. The light acceptance half-angle, which is an input half-angle for the optical fiber, is about 15–20 degrees in the preferred embodiment of optical system 22. For the preferred power of output light beam 43, the aforementioned FDA Class I safety regulations require a beam divergence for output light beam 43 that is within the above-mentioned light acceptance half-angle range. While output half-angle 38 can be greater than the light acceptance half-angle of the optical fiber, it is more efficient, and thus more desirable, to have output half-angle 38 equal the light acceptance half-angle of the optical fiber.

A further constraint on the refractive indices of cladding layers 11 and 12 and optically conductive core material 20 relates to preventing radiation of the reflected light beams out of channel 19 and into cladding layers 11 and 12 due to non-total or incomplete internal reflections. To ensure total internal reflections, $N_1$ for optically conductive core material 20 in channel 19 should be greater than $N_2$ for cladding layers 11 and 12. With $N_1$ greater than $N_2$, input light beam 39 from light source 28 can have total internal reflection as it traverses length 44 of channel 19.

$N_1$ is preferably at least 0.028 larger or greater than $N_2$. For the preferred embodiment described above, $N_1$ and $N_2$ are approximately 1.588 and 1.535, respectively. However, in an alternative embodiment of the present invention, $N_2$ and $N_1$, range from approximately 1.50 to 1.54 and 1.54 to 1.60, respectively. The actual indices of refraction are chosen to match the light acceptance half-angle of a mating optical fiber. Therefore, if a different optical fiber is used with optical system 22, then $N_1$ and $N_2$ can differ from the preferred ranged listed above.

To additionally ensure total internal reflection, half-angles 34, 35, 36, 37, and 38 should be greater than a critical angle as defined by Snell's Law of refraction, which is expressed in equation 2:

$$N_1 * \sin(\theta_i) = N_2 * \sin(\theta_r) \qquad \text{(eq. 2)}$$

where $\theta_i$ is an angle of incidence and $\theta_r$ is an angle of refraction. As illustrated in FIG. 2, angles 46 and 47 represent $\theta_i$, light beams 39 and 40 represent the incident light, angle 48 represents $\theta_r$, and light beam 50 represents the refracted light. Angles 46, 47, and 48 are measured from a dotted line 45, which is normal or perpendicular to surface 18. The critical angle is an angle of incidence that has an angle of refraction equal to 90°. An angle of incidence greater than the critical angle is totally internally reflected. Derived from Snell's Law, the critical angle ($\theta_c$) can be defined as the following:

$$\theta_c = \sin^{-1}\left(\frac{N_2}{N_1}\right). \qquad \text{(eq. 3)}$$

Expressed in terms of an angle measured from central axis 33, the critical angle ($\theta_c'$) can be approximated as the following:

$$\theta_c' = \cos^{-1}\left(\frac{N_2}{N_1}\right). \qquad \text{(eq. 4)}$$

Therefore, the values of $N_1$, $N_2$, and output half-angle 38, should be optimized such that output half-angle 38 is less than the critical angle defined in equation 4.

Waveguide taper angles 31 and 32 are chosen such that the beam divergence of input light beam 39 is increased while the taper is adiabatic and does not change the modes of the light conducted through channel 19. The preferred adiabatic characteristic of waveguide 10 can be accomplished by defining the waveguide taper angle 31 and 32 ($\alpha$) as the following equation proposed by Lee et al. in *Journal of Optical Communications*, volume 14, number 3, 1993, pages 1–5:

$$\alpha = \tan^{-1}\left(\frac{W_i - W_o}{2 \ast L}\right) \quad \text{(eq. 5)}$$

where $W_i$ is width 29 of round opening 26, $W_o$ is width 30 of round exit 27, and L is length 44 of channel 19. Assuming $\alpha$ is greater than zero, output half-angle 38 should be less than the critical angle, as defined in equation 4, minus $\alpha$.

The preferred adiabatic nature of waveguide 10 can further be defined by a worst-case estimation of a formula proposed by Ozeki et al. in *Electronics Letters*, volume 12, number 16, August 1976, pages 407–408:

$$\Delta_m = \frac{M_{out} - M_{in}}{M_{in}} = -\frac{\alpha \ast \left(\frac{W_o}{W_i} - 1\right)}{\sin(\theta_i)} \quad \text{(eq. 6)}$$

where $\Delta_m$ is a mode change of the transmitted light from round opening 26 to round exit 27, $M_{out}$ is a mode of output light beam 43, $M_{in}$ is a mode of input light beam 39. In the preferred embodiment of adiabatic optical waveguide 10, the mode change of the transmitted light is fractional or is much less than 1.0. Preferably, the mode change is less than about 0.05. As known in the art, the mode order for input light beam 39 or output light beam 43 is defined as an integer. However, since the mode change is much less than 1.0, the output mode is not changed from the input mode in accordance with the present invention. Therefore, the waveguide taper angles 31 and 32, which are defined as $\alpha$ in equations 5 and 6, should permit waveguide 10 to be adiabatic while simultaneously increasing the beam divergence.

The interface between optically conductive core material 20 and surfaces 17 and 18 is important for modal mixing or adding modes of light. While waveguide 10 can be used for single mode transmission, which is also referred to as collimated light transmission, the preferred transmission method uses modal mixing or scattered light. A waveguide that transmits light in a single mode can have a loss of light intensity at an interface, such as round exit 27, with an optical fiber or other light conductor. The decrease in light intensity can be a result of, for example, misalignment of the optical fiber and waveguide 10. With misalignment, the amount of background or modal noise is increased relative to the intensity of the actual light signal, which increases the likelihood of incorrect data interpretation and increases the bit-error rate.

However, increasing the number of modes during light transmission through tapered channel 19 reduces the detrimental effects of misalignment with an optical fiber, and as a result, the relative amount of modal noise and the bit-error rate are not significantly increased as in the case of single mode transmission. As mentioned previously, the half-angle of a light beam changes with each reflection within channel 19, and each of the different half-angles can represent a different mode of light. Consequently, as a light beam traverses tapered channel 19 from round opening 26 to round exit 27, the number of modes of the transmitted light beam increases. By distributing the light beam across a higher number of modes, the bit-error rate can be reduced. This improvement in the bit-error rate is due to the fact that a loss of one mode out of several hundred modes due to misalignment is not as significant as a loss of one mode out of a total of ten modes.

The tapering of channel 19 can relax alignment tolerances between light source 28 and waveguide 10 since round opening 26 may be larger than the opening used in a conventional waveguide. Furthermore, the alignment tolerance between round exit 27 of waveguide 10 and an optical fiber or other light conductor is also relaxed due to the increased beam divergence and modal mixing described previously. The tapering of channel 19 of waveguide 10 also relaxes the material constraints, namely the refractive indices of optically conductive core material 20 and cladding layers 11 and 12. In particular, the tapering of channel 19 permits the use of a larger combination of cladding layer materials and optically conductive core materials that have different indices of refraction, which otherwise could not be used.

While the invention has been particularly shown and described with reference to preferred embodiments, it will be understood by those of ordinary skill in the art that changes in form and detail may be made without departing from the spirit and scope of the invention. For example, surface 17 of cladding layer 11 can delineate a larger portion of channel 19 compared to surface 18 of cladding layer 12. Furthermore, if it were desired to decrease beam divergence, a light beam may be transmitted from exit 27, through channel 19, to opening 26.

As an additional example, channels 15 and 19 can have an oval, square, triangular, or other appropriate cross-sectional shapes instead of the preferred circular cross-section. However, surfaces 13, 14, 17, and 18 are preferably curved to provide significant advantages over conventional angular cross-sections. In particular, surfaces 17 and 18 of channel 19 prevent stagnant light transmission, which may occur at sharp corners of a waveguide channel. Elimination of conventional square or rectangular channels prevents light from being trapped in the sharp corners and, therefore, improves light transfer efficiency. Moreover, stress gradients are less pronounced in a channel having rounded surfaces compared to a channel having sharp corners. As a result of the more uniform stress distribution in a round channel, optically conductive core material 20 is less likely to delaminate from surfaces 17 and 18. Therefore, the reliability of waveguide 10 is improved, and light transfer efficiency is maintained.

Therefore, in accordance with the present invention, it is apparent that there has been provided an improved optical waveguide that overcomes the disadvantages of the prior art. The present invention is designed to meet FDA Class I safety regulations, is compatible with existing optical systems, maintains the integrity of the data transmitted by the optical signal, is manufacturable, is more reliable, and facilitates coupling to an optical signal source and an optical fiber.

We claim:

1. An optical waveguide comprising:

a cladding layer having a first end opposite a second end with a channel extending through the cladding layer from the first end to the second end, the cladding layer being opaque, the channel having a taper from the first end to the second end, the channel having a first opening at the first end and a second opening at the second end, the cladding layer having a first index of refraction; and an optically conductive core material in the channel having a second index of refraction greater than the first index of refraction.

2. The optical waveguide according to claim 1, wherein light conducted through the optically conductive core material has a mode change from the first opening to the second opening of $$\Delta_{mode} = \frac{M_{out} - M_{in}}{M_{in}} = \frac{-\alpha * \left(\frac{W_o}{W_i} - 1\right)}{\sin(\theta_i)}$$

where $\Delta_{mode}$ is the mode change of the light, $M_{out}$ is an output mode of the light, $M_{in}$ is an input mode of the light, $\alpha$ is an angle at which the channel is tapered, $W_o$ is a first width of the second opening, $W_i$ is a second width of the first opening, and $\theta_i$ is an input half-angle of the light into the optical waveguide, wherein the second width is greater than the first width.

3. The optical waveguide according to claim 2, wherein the mode change is less than 1.0.

4. The optical waveguide according to claim 2, wherein the optical waveguide is substantially adiabatic.

5. The optical waveguide according to claim 1 wherein the channel has a length defined as $$L = \frac{W_i - W_o}{2 * \tan(\alpha)}$$

where L is the length, $W_i$ is a first width of the first opening, $W_o$ is a second width of the second opening, the first width greater than the second width, and $\alpha$ is an angle at which the channel is tapered.

6. The optical waveguide according to claim 5, wherein $\alpha$ is less than approximately 1 degree.

7. The optical waveguide according to claim 1, wherein light conducted through the optically conductive core material from the first opening to the second opening has an increase in beam divergence of greater than approximately 5 degrees at the second opening compared to the first opening.

8. The optical waveguide according to claim 7, wherein the beam divergence of the light at the second opening is at least approximately 12 degrees.

9. The optical waveguide according to claim 1, wherein light conducted through the optically conductive core material and conducted out the second opening has an output half-angle less than a critical angle defined as $$\theta_c' = \cos^{-1}\left(\frac{N_2}{N_1}\right)$$

where $\theta_c$ is the critical angle, $n_1$ is the second index of refraction, and $n_2$ is the first index of refraction.

10. The optical waveguide according to claim 1, wherein the optically conductive core material is a light conducting adhesive.

11. The optical waveguide according to claim 1, wherein the first and second openings are circular and wherein the channel is conical.

12. The optical waveguide of claim 1 wherein light conducted through the channel has a greater beam divergence angle at the second opening than at the first opening and an output of a light generating source.

13. The optical waveguide of claim 12 wherein the taper is constant from the first end to the second end.

14. An optical system comprising:

a cladding layer having a first portion coupled to a second portion to form a channel therebetween, the channel having an opening at a first end of the cladding layer and an exit at a second end of the cladding layer, the opening wider than the exit, and the channel having a constant taper from the first end to the second end;

an optically conductive core material in the channel; and a light generation source coupled to the channel wherein light from the light generation source has a larger beam divergence angle at the exit of the cladding layer than at an output of the light generation source.

15. The optical system according to claim 14 wherein a first width of the opening is greater than a second width of the exit, wherein the opening and the exit are round, and wherein the channel is tubular.

16. The optical system according to claim 14 wherein a mode change of light conducted through the optically conductive core material is fractional.

17. The optical system according to claim 14 wherein the optical system is adiabatic.

18. The optical system of claim 14 wherein the cladding layer is opaque.

19. A optical system for increasing beam divergence of a light beam, the optical system comprising:

a light generating source;

a first opaque cladding layer;

a second opaque cladding layer, the first and second opaque cladding layers having a first index of refraction, the first and second opaque cladding layers coupled together to form a plurality of conical channels, each of the plurality of conical channels having a round opening with a first width and a round exit with a second width, the first width greater than the second width, at least one of the round openings coupled to the light source, each of the plurality of conical channels tapered from the round opening to the round exit at an angle wherein the taper is constant; and a light conducting adhesive in the plurality of conical channels and having a second index of refraction, the second index of refraction greater than the first index of refraction.

20. The optical system according to claim 19, wherein the angle is constant.

21. The optical system according to claim 20, wherein the angle is less than approximately 1 degree and wherein the round exit and the round opening are circular.

22. The optical system according to claim 19, wherein a mode change of light conducted through the light conducting adhesive is less than 0.05 and wherein the optical system is substantially adiabatic.

23. The optical system of claim 19 wherein light conducted through at least one of the plurality of conical channels has a greater beam divergence at its respective round exit than at its respective round opening and an output of the light generating source.

* * * * *